United States Patent
Morris et al.

[11] Patent Number: 6,087,660
[45] Date of Patent: Jul. 11, 2000

[54] NIGHT VISION DEVICE AND METHOD

[75] Inventors: Terry Duane Morris, Buckeye; Marcus Leslie Sutton, Gilbert, both of Ariz.

[73] Assignee: Litton Systems, Inc., Woodland Hills, Calif.

[21] Appl. No.: 08/970,871

[22] Filed: Nov. 14, 1997

[51] Int. Cl.$^7$ ...................................................... H01J 40/14
[52] U.S. Cl. .................................... 250/330; 250/214 VT
[58] Field of Search ............................. 250/330, 214 VT; 359/815, 407, 409

[56] References Cited

U.S. PATENT DOCUMENTS

| | | |
|---|---|---|
| 4,449,787 | 5/1984 | Burbo . |
| 4,672,194 | 6/1987 | Kastendreck . |
| 5,130,527 | 7/1992 | Gramer et al. ..................... 250/214 VT |
| 5,408,086 | 4/1995 | Morris et al. . |
| 5,506,730 | 4/1996 | Morley et al. . |

Primary Examiner—Edward P. Westin
Assistant Examiner—Richard Hanig

[57] ABSTRACT

A night vision device (NVD) includes a control circuit having an acceleration-responsive switch. When the NVD is in a generally horizontal use position, the acceleration-responsive switch enables a circuit allowing voltage to be applied to an image intensifier tube of the night vision device, so that night vision is provided. On the other hand, when the device is flipped up to a stowed position allowing the user of the device unobstructed natural vision, the acceleration-responsive switch senses the changed orientation of the gravitational acceleration vector, and turns off the image intensifier tube as well as other light-emitting sources of the night vision device. The acceleration responsive switch controls operation of voltage step-up circuit, which allows the NVD to be operated with a single one and on-half volt battery cell, and which also insures when it is turned off that not only is the image intensifier tube turned off, but also that all other possible sources of light emissions from the NVD are turned off.

14 Claims, 4 Drawing Sheets

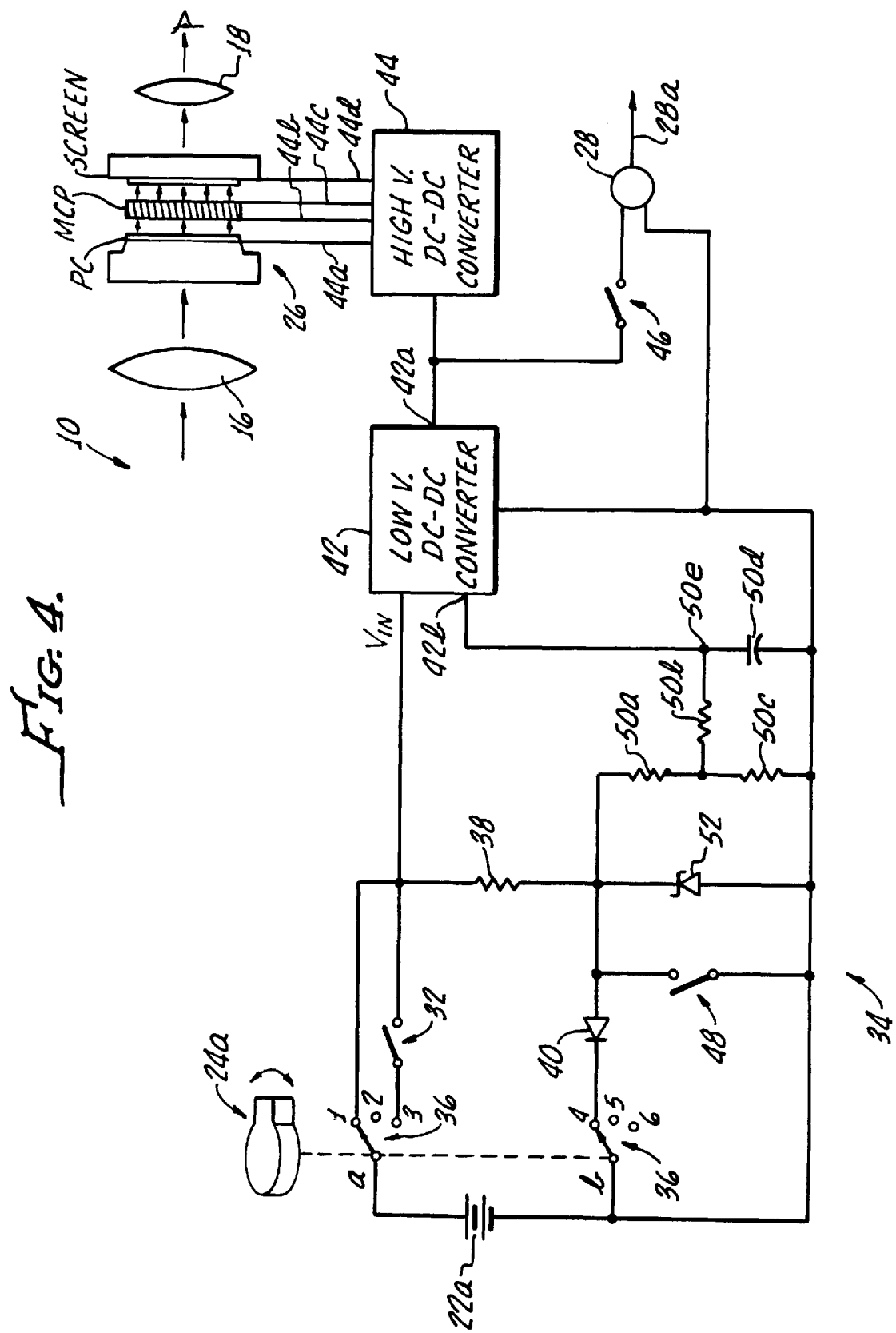

NIGHT VISION DEVICE AND METHOD

BACKGROUND OF THE INVENTION

1. Field of the Invention

The present invention relates to a night vision device (NVD). Particularly, the present invention relates to such a NVD which uses an image intensifier tube responding to light which may be either too dim or may be of a longer wavelength (i.e., infrared light) than can be seen using natural human vision. Thus, a scene illuminated by such light is substantially invisible to a human. Such a NVD using an image intensifier tube can provide a visible image replicating the scene. Still more particularly, the present invention relates to a method of operating such a NVD having an image intensifier tube.

2. Related Technology

NVD's are frequently used by military and law enforcement personnel for conducting operations in low light or at night. Devices which provide night vision and which use an image intensifier tube intensify the ambient light to produce an image which is visible to the human eye. Such NVD's may take a variety of forms. These various forms of NVD's may be categorized generally as follows:

- a binocular having a separate objective lens, image intensifier tube, and eyepiece for each eye;
- a goggle having a single objective lens, single image intensifier tube, and a splitting prism supplying an image to each of two eyepieces; and
- a monocular having a single objective lens, single image intensifier tube, and single eyepiece.

Some such NVD's are also made as weapon sights generally having a configuration similar to an optical rifle sight, but including an image intensifier tube. These night vision weapon sights usually have a single image intensifier tube and single eyepiece.

Hands Free Operation

While many NVD's are intended for hand-held use (or can be used in this way), it is common for operators of NVD's to want their hands free while they are using the NVD to benefit from night vision. Thus, a night vision binocular, goggle, or monocular device can be mounted as part of a night vision system (NVS) to either a face mask mount worn on the operator's face, or to a helmet mount secured to a helmet worn by the operator, for example. The typical face mask mounting assembly comprises a frame structure which is held to the operator's face by use of one or more straps wrapping about the operator's head. The face mask is provided with cushions resting against the operators face. At the operator's forehead, the frame structure includes provision to support the NVD in front of one or both of the operator's eyes. Helmet mounts are similar, with the exception that the support structure mounts to a protective helmet worn by the operator of the NVD.

Conventional hands-free NVS's of this nature are seen in each of U.S. Pat. No. 4,449,787, issued in May of 1984 to James H. Burbo, et al.(showing a night vision binocular); and in U.S. Pat. No. 4,672,194, issued in June of 1987 to William A. Kastendieck, et al., (showing a night vision goggle). The Burbo NVS uses a battery pack carried on the rear of a helmet, and provides two pairs of matching electrical contacts, one pair on each of the helmet mount and on the night vision binocular. These pairs of electrical contacts engage one another so that electrical power is provided to the binocular only when it is supported in a viewing position on the helmet mount. Thus, when the operator flips the NVD upward to a stowage position providing unobstructed natural vision, the NVD is turned off.

The Kastendieck NVS is somewhat different than that of Burbo in that the goggle of Kastendieck includes its own power supply, and the mount does not provide for the NVD to flip up to provide unobstructed natural vision. Instead, in order to have unobstructed vision the operator of the Kastendieck system disengages a latch and slides the NVD off of the support structure. In this case, turning off of the NVD when its is removed from the mount is effected by the provision of a magnet carried on the helmet mount. When the NVD is removed from its mount this magnet is removed from proximity to a magnetic reed switch of the NVD, and a control circuit within the goggle is used to responsively turn it off.

Two NVS's which are more recent than those of Burbo and Kastendieck are seen in U.S. Pat. No. 5,408,086, issued Apr. 18, 1995 to Terry D. Morris, et al.; and in U.S. Pat. No. 5,506,730, issued Apr. 9, 1996 to Roland M. Morley, et al. The NVS taught by the Morris patent is believed to provide both a flip-up NVD carried on a face mask or helmet mount, and to also provide automatic turning off of the NVD when it is flipped up. Such an automatic turning off of a NVD when it is flipped up is especially important for safety of the operator because the NVD in operation emits light, and such a light emission could reveal the operator's position to hostile personnel if the device were flipped up but left in operation. Also, the operator should not be required to remember to turn off a NVD before flipping it up.

For this safety purpose, the Morris device utilizes a magnet carried by the mount in a position to influence a magnetic reed switch of the NVD. The NVD moves away from this magnet when it is flipped up about a hinge line spaced from the magnet. As with the Kastendieck NVD, the device of Morris turns off when it is separated from the magnet of the mount. However, in contrast to Kastendieck, Morris does provide for unobstructed vision for the user of the device without having to remove the device from its mount. This is simply done by flipping the NVD up to the stowed position. The device can then be returned to use by simply flipping it back down to its viewing position. Further, Morris does not require the use of exposed electrical contacts as were used by Burbo.

The Morley NVS also utilizes a magnetic interaction between a mount and a NVD, but the magnet in this case is carried in a part of the mount that moves along with the NVD as it is flipped up. In the Morley NVS the magnet moves between alternative positions spaced close to or remote from the magnetic reed switch of the device dependent upon the direction of the gravitational vector. Thus, when the device is flipped up to provide unobstructed natural vision, the magnet moves away from the reed switch, and the NVD turns off.

With each of these conventional NVS's utilizing a magnetic interaction of the device and its mount, if the NVD is removed off of its mount, the NVD turns off because it is separated from the magnet of the face mask or helmet mount. Such conventional NVD's may also provide for their operation while they are removed from their mounts (for hand-held operation, for example) by selective manipulation of a control switch. This selective interaction of the control switch disables the safety features ordinarily functioning to provide automatic turning off of the device when it is flipped up or removed from its mount.

Particularly, in view of the above it is to be noted that in the interest of operator safety, some conventional NVS's (Burbo) require for their operation a cooperation between the device and their mount (on a helmet, for example). Thus, removal of the device from its mount or flipping it up also turns the NVD off. Further, some other conventional NVS's (Kastendieck) require a cooperation between their mount and the NVD in order to insure that the NVD is turned off if it is removed from the mount. Still other conventional NVS's provide for the possibility of unobstructed natural vision for their operator without having to remove the NVD from its mount. In some cases, such as represented by the Burbo device, the structure which provides for operation of the NVD on its mount (i.e., the exposed electrical contacts) is also responsible for turning off the NVD when it is flipped up. In the case of the Kastendieck device the removal of the device from its mount turns it off. Morris and Morley both provide for turning off the NVD if it is either removed from its mount or flipped up.

In the case of the Morris and Morley devices discussed above, a cooperative relationship between the NVD and its mount exists when the device is used for viewing on its mount, and this relationship is interrupted when the device is flipped up. In the Morris device, a magnet and reed switch are used, which are separated by flipping the NVD up. In the Morley device, a magnet moves with the portion of the mount flipping up along with the NVD, but the magnet moves sufficiently away from a reed switch of the NVD as a result of the changed direction of the gravitational vector when the device is flipped up that the device is responsively turned off.

Single-battery NVD's

Another aspect of some conventional NVD's is their ability to be operated using a single battery cell, usually of one and one-half volts (such as a AA alkaline cell, for example). Such "single-battery" NVD's employ a conventional low-voltage voltage step-up circuit to convert battery voltage to an intermediate voltage, which intermediate voltage is then supplied to a high-voltage voltage step-up circuit. The high-voltage circuit provides the voltages necessary for operation of the image intensifier tube.

The conventional low-voltage voltage step-up circuits have a control pin or terminal to which a control voltage may be supplied to control operation of the step-up circuit. However, when the control voltage supplied to this control pin is in the range supposedly shutting down operation of the step-up circuit the voltage provided by the circuit is merely reduced from the intermediate voltage to battery voltage. In other words, the conventional low-voltage voltage step-up circuits known for use in such single-battery NVD's do not completely shut off their output voltage so long as battery voltage is applied to the circuit.

Consequently, if such a conventional single-battery NVD's were provided with an automatic turn off feature operating as discussed above (i.e., operating when the NVD is taken off of its mount or flipped up), this safety feature requires the utilization of a separate power cut off switch, which when opened removes battery power from the low-voltage voltage step-up circuit. Such is the case for at least two reasons. First, because such NVD's may have one or more low-voltage devices which are supplied the intermediate voltage from the step-up circuit (such as an infrared illuminator of the NVD), this illuminator might continue to operate even when the voltage at the output pin of the circuit is reduced to battery voltage. Second, with such a conventional NVD having a conventional low-voltage voltage step-up circuit, if the battery were sufficiently fresh and were providing a sufficient voltage level to the high-voltage step-up circuit (i.e., because this battery voltage is still passed through the low-voltage step-up circuit when this circuit is supposedly turned "off"), then the image intensifier tube could still continue to operate. Continued operation of the image intensifier tube is possible under such conditions because the high-voltage multiplier circuit may be receiving a sufficient voltage (i.e., battery voltage) for its continued operation (although with somewhat reduced output voltages).

This possible condition of continued operation of the image intensifier tube of a conventional single-battery NVD after a "shut down" of the low-voltage voltage step-up circuit especially could apply if the image intensifier tube is already on and has been operating for awhile. Although full voltage levels may be required to bring an image intensifier tube into operation, once it is operating some image intensifier tubes can be maintained in operation with lower voltage levels from the high-voltage voltage step-up circuit. Thus, even though the high-voltage circuit provides reduced voltages when it is supplied only with battery voltage, these voltages may be enough with a fresh battery to keep some image intensifier tubes operating. Thus, some NVD's of this type might not shut off completely when the safety feature is activated. As discussed above, the risk of this happening is too great.

For this reason, an additional safety switch is conventionally required which automatically opens to shut off power to the low-voltage voltage step-up circuit, shutting off the image intensifier tube of the NVD, as well as shutting off any other light emitting devices of the NVD.

SUMMARY OF THE INVENTION

In view of the above, it is an object for this invention to avoid one or more of the shortcomings of the conventional technology.

In view of the above, it would be an advantage and it is an object for this invention to provide a NVD which is not dependent upon any interaction whatsoever between the device and a mount for the device, such as a face mask mount or helmet mount, for example, in order to effect turning off of the device should it be flipped up by its user. That is, the device itself may be gravitationally responsive in order to cause the device to be turned off when it is flipped up.

Accordingly, a principal object of the present invention is to provide a NVD which responds to acceleration so that a change in the direction of the gravitational acceleration vector is effective to turn off the device when it is flipped up on a mount, such as on a face mask or helmet mount.

Further, an object of this invention is to provide such an acceleration responsive NVD which requires no interaction with its mount in order to effect turning off of the NVD when it is flipped up.

Still further, an object of this invention is to provide such an acceleration responsive NVD which includes a time delay function making the device immune to turning off because of ordinary accelerations occurring during its use, but which do not indicate that the device has been flipped up.

Additionally, the present invention has as an object the provision of such a NVD which is operable by a single one and one-half volt battery cell, and in which both the operation of the image intensifier tube and of all other potential or actual light-emitting sources of the NVD are shut off simultaneously when the device is turned off in response to being flipped up.

To achieve the foregoing objects and in accordance with the purpose of the invention, a night vision device (NVD) comprises: an image intensifier tube; a source of electrical power for said image intensifier tube; and a switch circuit which in a first position of said NVD relative to the earth allows electrical power supply to said image intensifier tube, in a second position of said NVD relative to the earth said switch circuit causing electrical power supply to said image intensifier tube to be discontinued; whereby in said second position of the night vision device, said image intensifier tube is turned off.

Additionally, a NVD embodying the present invention may comprise: an image intensifier tube; a single battery cell providing battery voltage for providing the sole source of electrical power to the image intensifier tube, thus causing the image intensifier tube to provide a visible image in response to receipt of light; a low-voltage voltage step-up circuit receiving battery power at battery voltage, and said low-voltage step-up circuit responsively providing at a voltage output terminal an intermediate voltage which is above battery voltage, said low-voltage voltage step-up circuit further having a shutdown terminal to which supply of voltage above a certain threshold causes voltage at said voltage output terminal to be reduced from said intermediate voltage to substantially less than said battery voltage; a high-voltage voltage step-up circuit receiving said intermediate voltage from said voltage output terminal and providing high voltage levels to the image intensifier tube for operation of the image intensifier tube; and a switch circuit in response to a pre-determined criteria connecting a voltage level above said certain threshold to said shutdown terminal; whereby, occurrence of said pre-determined criteria causes said low-voltage voltage step-up circuit to shut down, causing said high-voltage voltage step-up circuit to cease providing said high voltage levels to said image intensifier tube, and causing said image intensifier tube to cease providing said image.

Additional objects and advantages of the present invention will be seen from the following detailed description of a single exemplary preferred embodiment of the invention taken in conjunction with the appended drawing Figures, in which the same reference numeral is used though out the several views to indicate the same feature or features which are analogous in structure or function.

BRIEF DESCRIPTION OF THE DRAWING FIGURES

Figure 3:
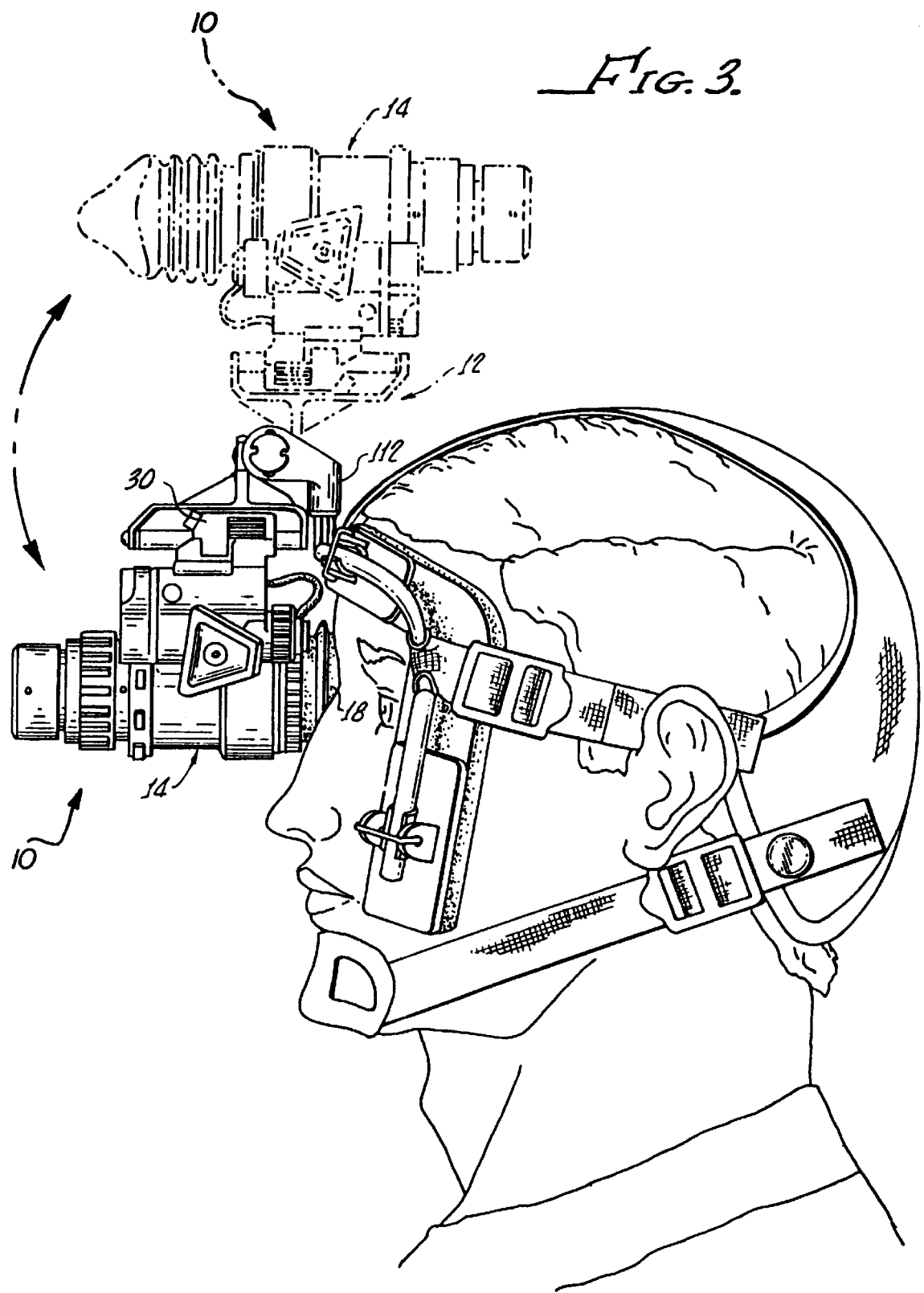

FIG. 3 provides a side elevation view of a NVS of the face-mask type. Again the flipped up position for the NVD is illustrated, but this time it is shown in dashed lines; and FIG. 4 provides a schematic representation of the relevant portion of an electrical control circuit for the NVD's seen in the preceding Figures.

DETAILED DESCRIPTION OF A SINGLE EXEMPLARY PREFERRED EMBODIMENT OF THE INVENTION

Figure 1:
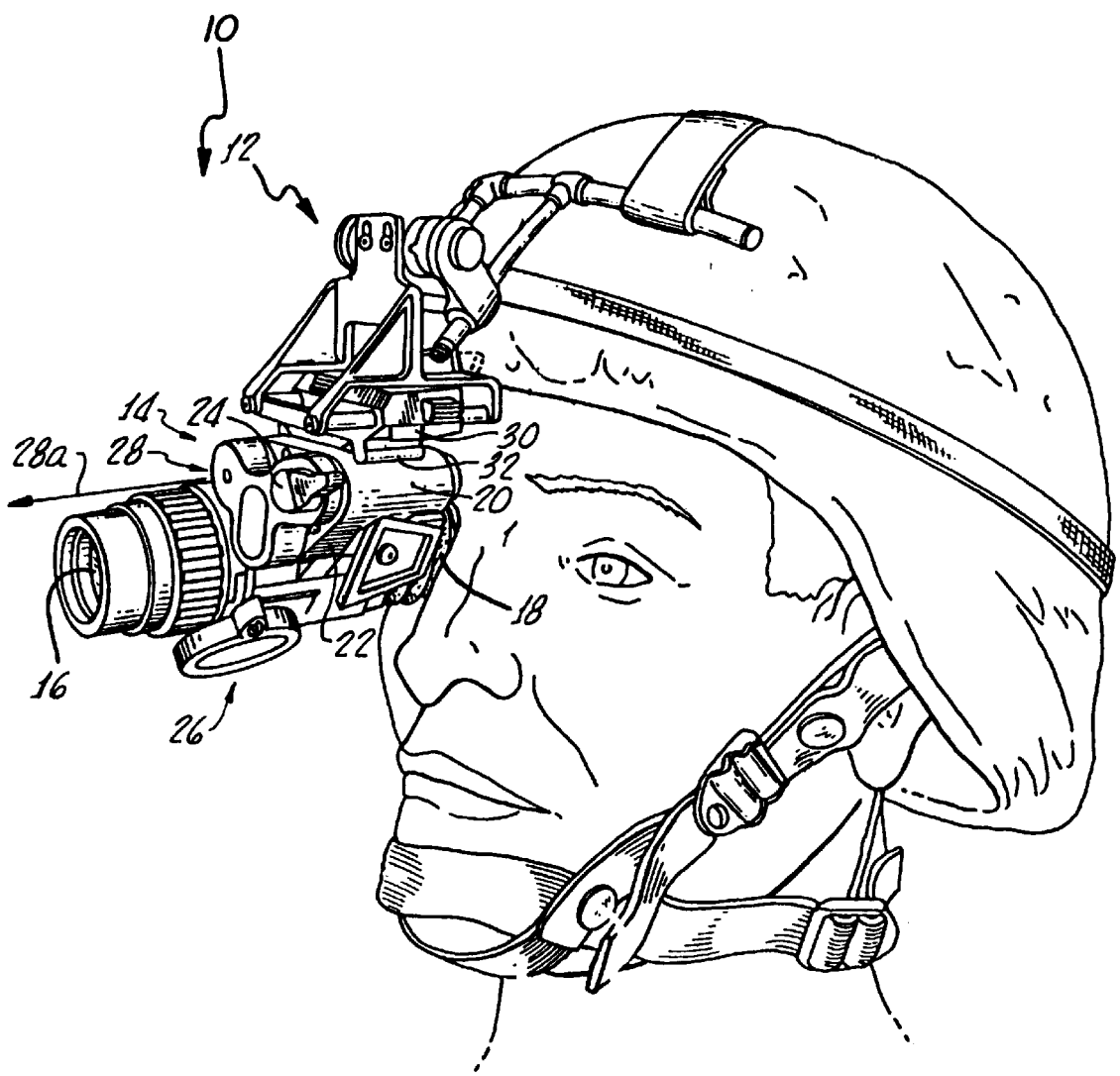
FIG. 1 is a perspective view of a night vision system (NVS) embodying the present invention. In this case, the system is mounted to a helmet worn by an operator, and a night vision device (NVD) of the system is in an operational position providing night vision for one of the operator's eyes.
Figure 2:
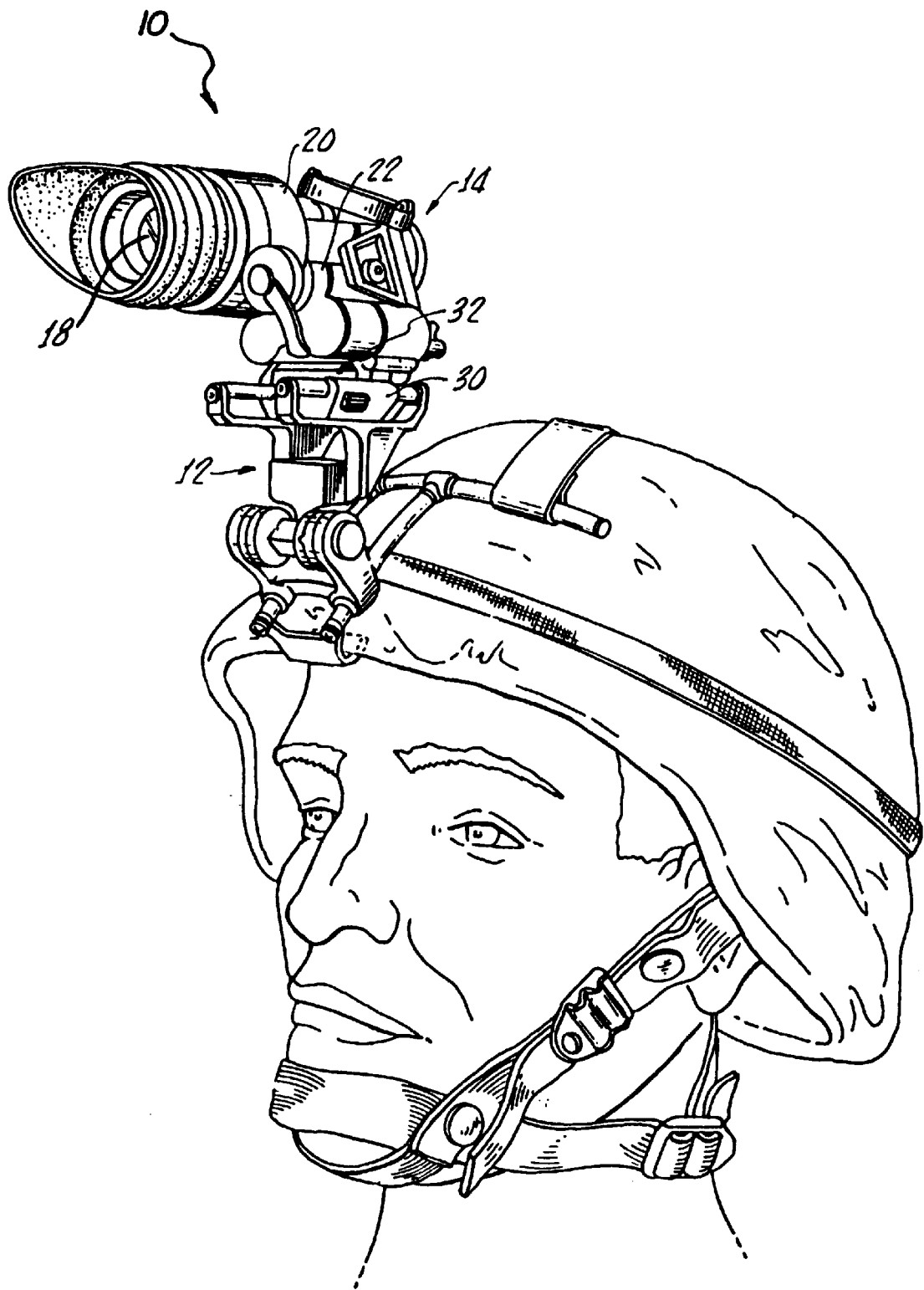
FIG. 2 is a perspective view of the NVS seen in FIG. 1, but showing the NVD flipped up to a stowed position allowing unobstructed natural vision for both of the operator's eyes.

Referring first to FIGS. 1 and 2, there is shown a human operator (not referenced) wearing a helmet to which is mounted a NVS 10. The NVS 10 includes a flip-up mount 12, and an acceleration-responsive NVD 14 removably carried on this flip-up mount. In this case, the NVD 14 is of monocular configuration, providing night vision to only one of the operator's eyes in the position seen in FIG. 1. Those ordinarily skilled in the pertinent arts will understand that the invention is not limited to this or any other particular configuration of night vision device. For example, the NVD could be configured as a binocular, as a goggle, or as a pair of monoculars used simultaneously in conjunction with one another to provide biocular vision. In this position of FIG. 1, one of the operator's eyes has unobstructed natural vision. FIG. 2 provides an illustration of the NVD 14 in a stowed position flipped up to provide the operator with unobstructed natural vision with both eyes.

The NVD 14 of monocular configuration seen in FIGS. 1 and 2 includes an objective lens 16, an eye piece 18, and a housing 20 extending between the objective lens and the eye piece. Within the housing 20 is located a battery (to be further indicated below), which is located within a battery housing portion indicated with arrowed numeral 22, a control circuit (to be further explained below), and control switches with handles or knobs (generally indicated with the arrowed numerals 24). These switch handles or knobs are exposed on the outside of the housing 20. Within the housing 20 is located an image intensifier tube (indicated with arrowed numeral 26 in FIG. 1).

In this case, the NVD 14 includes a single one and one-half volt battery, which is preferably an alkaline cell of AA size. The invention is not limited to use of a single battery cell, to a battery cell of a particular size, nor to a battery power supply voltage of one and one-half volts. For example, two or more batteries in parallel could be used to provide about one and one-half volts, but with a commensurably increased amp-hour rating and an increased use interval for the device 14 before the batteries have to be changes. Similarly, a single AAA size battery cell could be used in a NVD embodying the present invention. Also, a physically larger single battery cell, such as a single C size cell could be utilized in a NVD embodying the present invention.

Still further, it will be seen that single battery cells of other than one and one-half volt output can be used in a NVD embodying the invention. For example, a single lithium battery cell, usually providing a nominal voltage output of about 3.6 to 3.9 volts can be used. A lithium battery cell of about 1.7 volts nominal output is also believed to be available, and also might be used in such a NVD. However, because the NVD 14 is mounted to and supported by the head of the user, considerations for all of: light weight, the reduction of overhanging (or cantilevered) weight hanging in front of the user's head, and a low moment of inertia for the device 14 are all important. Accordingly, a most preferred configuration for the device 14 utilizes a single battery cell, preferably of one and one-half volt output, and preferably of AA battery size.

Further, in order to provide supplemental light with which an image can be provided by the image intensifier tube of the device 14 even when natural moon light, star light, or other natural or artificial sources of light do not provide a sufficient level of ambient light, the NVD 14 includes an infrared light source indicated with arrowed numeral 28. This infrared light source may be implemented conveniently by providing an infrared light emitting diode (LED) housed within the housing 20 and selectively projecting an beam 28a of infrared light. Such infrared light is invisible to natural human vision. However, when the beam 28a is needed and is turned on by the operator of the device 14, the image intensifier tube within the device 14 can utilize such invisible infrared light to provide a visible image to the user of the device.

To use the monocular NVS 10, the operator dons the face mask or helmet, preferably with the mount 12 already in place, places the device 14 on the mount 12 and also places the NVD 14 in the position seen in FIG. 1. The operator then turns on the NVD 14 by manipulation of a switch knob 24, and looks through the eye piece 18. In this use, the operator will see an enhanced or intensified image representative of the scene illuminated by low-level or infrared light which enters the objective lens 12.

The NVD 14 seen in FIG. 3 is the same as that seen in FIGS. 1 and 2, except that the mount for this device is in this case of conventional face-mask configuration. Because the face mask and helmet mounts seen in FIGS. 1–3 are conventional and are similar except as noted, these mounts are indicated with numeral 12 in FIGS. 1 and 2, and with numeral 112 in FIG. 3. Hereafter, when ever the mount 12 is referred to, the reader will understand that the mount 112 of FIG. 3 is also included in this reference.

In each case, the mount 12 includes a conventional magnet 30 positioned so that a magnetically-responsive switch (indicated by arrowed numeral 32 in FIGS. 1–3) of the NVD 14 is closed because of proximity to the magnet 30. This closure of the switch 32 enables operation of the device 14 while it is on the mount 12. As is explained in discussing the Kastendieck patent mentioned above, it is conventional in the art when a NVD is removed from its mount that the device shut off. The NVD 14 includes this feature because, as will be further explained, this magnetically-responsive switch 32 will cause the NVD 14 to be automatically turned off if the magnet 30 is separated sufficiently form the switch 32. Also, as will be seen, the switches of the device 14 allow for manipulation of the knobs 24 so that the device 14 can be operated without being mounted to a mount 12. That is, the device 14 can be operated while it is hand-held, for example.

The flip-up mount 12 enables the operator to manipulate the NVD 14 between the operational position shown in FIG. 1, and the stowed position shown in FIG. 2. In FIG. 1, the monocular 10 is positioned relative the operator's eye so that the operator can normally view through the monocular with one eye. In FIG. 2, the monocular 10 has been raised to the stowed position so that both of the operator's eyes are unobstructed. However, it is to be noted that in the stowed position of FIG. 2, the eyepiece lens of the device 14 is facing forward, and that light emitted from this eyepiece could reveal the operator's position, even to those not using night vision equipment. In the case of potentially hostile personnel who are equipped with night vision equipment, the amount of light coming from the eyepiece 18 would allow detection at a considerable distance, perhaps several miles. Thus, it is important that the device 14 be turned off when it is flipped up. The operator should not have to remember to turn the device 14 off before flipping it up.

However, as is to be noted, viewing FIGS. 1–3, the magnet 30 does not change its relative position to the switch 32 when the device 14 is flipped up to its stowed position. Thus, simply flipping up a conventional NVD on the mount 12 to its stowed position would not cause the NVD to turn off. As discussed above, the U.S. Pat. No's. 5,408,086; and 5,506,730; present NVS's with possible solutions to this situation, so that a conventional NVD will be turned off when flipped up. However, in each conventional system, a cooperation or interaction of the NVS mount and NVD is required in order to effect turning off of the NVD when it is flipped up.

Turning now to FIG. 4, the relevant portion of a control circuit 34 for the NVD 14 is schematically depicted. This control circuit 34 is housed within housing 20, and is associated with a battery 22a received within battery housing portion 22. In this case, the battery 22a is preferably a single one and one-half volt cell. Most preferably, the battery 22a is a single one and one-half volt alkaline AA cell. Alternatively, and interchangeably as will be seen, the battery 22a may be a single lithium cell providing a nominal voltage of about 3.6 to 3.9 volts.

The control circuit 34 includes a conventional magnetically-responsive switch 32, which in this case is configures as a magnetic reed switch. Accordingly, when the device 14 is removed from its mounting on mount 12, it is automatically turned off. Further, the control circuit 34 of device 14 also includes a three-position control switch 36 having two sets of ganged switch contacts indicated on FIG. 4 with the characters "a", and "b". These switch contacts are numbered 1–3 and 4–6. The "a" and "b" switch contacts close in unison with one another as the control knob 24a of this switch is manipulated by the user of the device 14, so that the contact closure possibilities are: a-1, b-4; a-2, b-5; and a-3, b-6. For ease of reference, the switch positions are hereafter referred to by reference to position of the "a" set of switch contacts, and are hence switch positions #1, #2, and #3 for the switch 36.

A perusal of FIG. 4 shows that the switch position #2 is a "device off" position. That is, FIG. 4 shows that this position of the switch 36 closes contacts which are not connected. In opposite directions of rotation for knob 24 from switch position #2, the switch 36 provides positions #1 and #3. It will be seen that both switch positions #1 and #3 are "device on" positions, and both respectively close a circuit including the battery 22a, and a first voltage dropping resistor 38. In switch position #1, the contacts "a-1" and "b-4" both close so that the circuit with battery 22b is completed via a diode 40. With this circuit completed, the voltage drop experienced across resistor 38 and diode 40 (the diode being in parallel with series-connected resistors 50a and 50c, to be further described below) is supplied to a "Vin" terminal of a low-voltage DC-to-DC voltage converter circuit 42.

While a variety of circuits may be utilized to fulfill the function of circuit 42, a particular circuit which well fulfills this function, and which is particularly preferred, is a Microlinear integrated circuit No. ML4875ES-T. This circuit provides an output voltage of nominal 3 volts at an output terminal 42a when the circuit is supplied with a nominal one and one-half volt input. Further, this circuit will maintain the nominal 3 volt output as battery voltage drops considerably below one and one-half volts. On the other hand, if a battery of greater than one and one-half volts output is used in the device 14, as might be the case, for example, under extremely cold operating conditions, then the circuit 42 passes this voltage to circuit 44 (which is described below) without stepping the voltage up. As the battery voltage declines with use, it will eventually drop to a voltage level at which the circuit 42 begins to operate to step up this voltage, maintaining the intermediate voltage at output terminal 42a. In this way, a greater amount of energy can be extracted from a battery, keeping the device 14 operating even when the battery voltage is too low to operate the device 14 except for the "stepping up" of this battery voltage to the intermediate voltage, as is effected by the circuit 42.

From the terminal 42a, the voltage from circuit 42 is provided both to a high-voltage DC-to-DC voltage converter circuit 44, and to the infrared light source 28 via an intervening switch 46. The switch 46 may be selectively closed by the operator of the device 14 to provide the beam 28a of infrared light for illumination purposes, as was described above. The high-voltage converter circuit 44 provides respective voltages on leads 44a, 44b, 44c, and 44d, respectively connecting to a photocathode (referenced "PC"), to first and second faces of a microchannel plate (referenced "MCP"), and to a screen electrode (referenced "screen") of the image intensifier tube 26, all as is seen in FIG. 4. Thus, when the circuit 42 is providing a nominal voltage of 3 volts at terminal 42a, the voltage multiplier circuit 44 will operate image intensifier tube 26 to provide an image at eyepiece 18. Further, under this condition the infrared illuminator 28 may be operated by selective closure of switch 46 to provide illuminator beam 28a.

In view of the above, it is seen that if switch 36 is in the #1 position the reed switch 32 is bypassed and the device 14 is in a "hand held" mode of operation. On the other hand, with switch 36 in the #3 position, the NVD 14 will operate on mount 12, but removal of the device 14 from the mount 12 will result in the magnetic reed switch 32 opening. Opening of switch 32 opens the battery circuit, and automatically shuts off the device 14.

On the other hand, with the switch 36 in the #3 position, current flow through resistor 38 will flow either through a switch 48 if this switch is closed, or will flow through a resistor-capacitor (R-C) network (generally indicated with the numeral 50) if the switch 48 is open. The switch 48 is an acceleration-responsive switch or a "tilt" switch, and is further described below. The resistor-capacitor network 50 includes resistors 50a, 50b, and 50c, and a capacitor 50d. The voltage drop across this R-C network 50 when switch 48 is open is limited to a certain diode voltage drop by zener diode 52. At a node 50e in the R-C network 50, the time-variant voltage experienced in this network 50 (i.e., time-variant following an opening or closing of switch 48) is provided to a shutdown pin 42b of the circuit 42. Circuit 42 is configured so as to provide a nominal 3 volt output to pin 42a so long as the voltage to pin 42b is below a certain voltage threshold, and will cut off this output voltage at connector 42a when the voltage at connector pin 42b raises above this threshold voltage. That is, when a voltage above the shut down threshold voltage is applied to pin 42b, the circuit 42 substantially shuts off all voltage to pin 42a. The Microlinear circuit noted above has a shutdown voltage threshold of 200 mv, plus or minus about 20 mv. There is also a hysteresis of about 50 mv applying to this voltage threshold, so that after exceeding this threshold, when applied voltage at pin 42b drops below the shutdown threshold voltage, the circuit 42 does not switch on voltage to pin 42a until a level of about 130 mv to about 170 mv is reached.

As explained above, this characteristic of circuit 42 is in contrast to the conventional low-voltage voltage multiplier or voltage step-up circuits previously known for use in the NVD art. Such is the case because these previous voltage step-up circuits varied their output voltage between an intermediate voltage (which was stepped-up relative to battery voltage), and battery voltage, dependent upon whether a certain voltage was applied at a control pin of these conventional integrated-circuit voltage step-up circuit chips. It is to be remembered from the above that the conventional voltage step-up circuits never completely shut off their output voltage so long as battery voltage was applied to the circuit.

Consequently, with conventional voltage step-up circuits, low-voltage devices such as an infrared illuminator (i.e., like LED 28) could still continue to operate even when the voltage at the output pin of the circuit was reduced to battery voltage. As explained above, with such a conventional voltage step-up circuit, if the battery were sufficiently fresh and providing a sufficient voltage level to the high-voltage step-up circuit, then the image intensifier tube of the conventional NVD could still continue to operate because the high-voltage multiplier circuit would be receiving a sufficient voltage for its continued operation.

In contrast to NVD's with such conventional voltage step-up circuits, the circuit 42 of the device 14 insures that when the voltage at control pin 42b raises above the certain voltage threshold, the voltage output at pin 42a is cut off. Consequently, when the voltage step-up circuit 42 is shut down by the certain voltage level at control pin 42b, both the infrared illuminator 28 and the image intensifier tube 26 are positively shut off.

Now, it is to be understood that a tilt-responsive switching function at switch 48 is desired in order to distinguish between the two positions for the NVD seen in FIGS. 1 and 2, for example. To this end, the switch 48 is selected to be an acceleration-responsive type which will open or close in response to tilting of the NVD 14. Such a tilt-responsive switching function is seen in mercury switches, and in rolling-element switches, for example. These switches are responsive to tilting because the direction of the gravitational acceleration vector changes as the switches are tilted.

Thus, these tilt-responsive switches are seen to also be acceleration-responsive, and to be activated (i.e., either opened or closed) when the acceleration vector applicable on the switch (i.e., usually from gravity) reaches a certain threshold. Because such switches are in this way acceleration-responsive, they are also subject to being activated by accelerations other than gravity. This aspect of switch 48 can be a concern with a NVD because it is desired to be able to use the NVD under combat conditions, as well as while running or while operating a vehicle, for example. In such a use an unexpected turn off of the NVD could be catastrophic.

Accordingly, the present implementation of the invention accounts for this acceleration-responsive aspect of the switch 48. A particularly preferred switch for use at 48 is available from Comus International, as part No. CW1300-0, which is identified as a non-mercury tilt switch. This particular tilt switch is actually not particularly sensitive to tilting so that the operator of the NVD can look downward or upward without the NVD 14 turning off. Actually, the operator of the NVD could lay on his back and work on the underside of a vehicle using the NVD 14 to provide vision. So long as the NVD is pointed vertically upward and is not put in a position close to the flipped up position of FIG. 2, then the NVD will remain on. On the other hand, flipping the NVD to its position of FIG. 2 does cause a sufficient change in tilt (i.e., direction of the gravitational acceleration vector) to activate the switch 48 and turn the NVD 14 off. Other acceleration-responsive or tilt-responsive switches are available in the market.

This switch 48 is oriented to be closed when the device 14 is in the position seen in FIG. 1, and to be opened when the device is flipped up or is placed in a position close to that seen in FIG. 2. As a result, when the device 14 is flipped up, the switch 48 opens, and the voltage at node 50e increases over time toward the certain threshold voltage for the circuit 42 according to the R-C time constant of the network 50. As soon as this voltage at node 50e raises above the shutdown voltage threshold for circuit 42, the voltage at output pin 42a is shut off, and the image intensifier tube 26 is shut off. Also, simultaneously, if the light source 28 is on, it also is shut off.

The R-C time constant of the circuit 50 is chosen to be sufficiently short that the light emissions from the NVD 14 are shut off shortly after it is flipped up to its position of FIG. 2. This interval of delay before a shut off of the image intensifier tube is relatively short, and is on the order of from one-half to about one and one-half seconds, dependent upon the values of the circuit components selected. On the other hand, this R-C time constant of the network 50 is also chosen to be sufficiently long that the device 14 is not susceptible to being shut off inadvertently by normal and ordinary movements of the NVD 14 which occur during movements of the operator. For example, as was mentioned above, the preferred switch 48 is not particularly susceptible to changes in tilt angel, but it could be activated by vigorous movements of the operator. That is, the switch 48 could be activated by the accelerations effective when the operator runs or operates a vehicle, for example.

In order to prevent such vigorous movements of the operator (which momentarily apply accelerations to the device 14 sufficient to momentarily open switch 48) from also causing the NVD to momentarily turn off, the R-C network 50 is provided with two important aspects. First, when switch 48 is opened, it is seen that the voltage at node 50e will start to increase toward the shut down voltage threshold for circuit 42. The switch 48 may open momentarily because of vigorous movement of the operator, such as running for example. However, such vigorous accelerations will not be sustained long enough that the shutdown voltage will be reached at node 50e, and so the NVD 14 will not shut off. Second, when the momentary acceleration passes and the switch 48 is re-closed, the voltage at node 50e drains away also according to the R-C time constant of the network 50. But, and importantly, this time constant is a different one than the one applying during charging of voltage to node 50e.

Moreover, with the switch 48 closed, the time constant for draining voltage away from the capacitor 50d is quicker than the time constant applying during charging of this capacitor with the switch 48 opened. This is the case because during charging of this capacitor, the resistor 50a provides current flow toward the capacitor, with this current being divided to flow partly though resistor 50b to the capacitor, and partly through resistor 50c to ground. On the other hand, when the switch 48 is closed, the resistor 50a also provided a drainage pathway to ground via the closed switch 48 in parallel with resistor 50c. Consequently, a "quick reset" aspect is provided in the circuit 34, and the node 50e will not ordinarily reach the shutdown voltage threshold for shut off of circuit 42 with normal movements of the operator of the system 10. The "quick reset" feature insures that, for example, in a condition of continual accelerations affecting the switch 48 (i.e., repeated accelerations, perhaps with a short time interval between accelerations, as might happen when the operator runs for some distance) that voltage left on capacitor 50 from a previous opening of the switch 48 is quickly drained when the switch re-closes, and does not effect the next cycle of charging of the capacitor 50d the next time the switch 48 is opened.

The R-C time constants of the network 50 can be selected so that not even vigorous repeated movements of the operator will cause the NVD to shut off. That is, as will be appreciated, the value of the circuit components seen in FIG. 4 may be varied to select an R-C time constant for charging and for discharging of capacitor 50d so that the desired operational characteristics for the device 14 are obtained.

An advantage of the present invention results from the fact that automatic turning off of the device 14 in response to flipping up of the device does not depend upon any cooperation or interaction of the mount 12 (or of any other flip-up mount) with the device 14. Accordingly, the device 14 will automatically shut itself off (with switch 36 in position #3) regardless of the details of the flip-up mount upon which the device may be used. So long as the flipped up position of the device is sufficiently angled with respect to the generally horizontal position for the device seen in FIG. 1, the NVD 14 will turn itself off when flipped up.

Further, when a shut off of the device 14 is effected by the control circuit 34, the image intensifier and light emitting diode 28 are both simultaneously and positively shut off. In other words, battery voltage does not continue to be available at the output terminal 42b of circuit 42, and the image intensifier tube will definitely and positively stop operation because the high-voltage step-up circuit is deprived of a sufficient voltage level for it to continue providing the high voltage levels necessary at the output of this circuit to operate the tube 26.

While the present invention has been depicted, described, and is defined by reference to a single particularly preferred exemplary embodiment of the invention, such reference does not imply a limitation on the invention, and no such limitation is to be inferred. The embodiments of the present invention are capable of considerable alteration and modification without departing from the spirit and scope of the invention. For example, a NVD which is configured for only hand-held use may according to the present invention be provided with a housing which will tip onto its side when laid down. That is, for example, the housing may have an angulated or canted lower surface. Consequently, after use of the device, when a user lays it down, the device will automatically turn itself off just like the device 14 does when it is tilted away from the horizontal. Thus, the invention is intended to be limited only by the spirit and scope of the appended claims, giving full cognizance to equivalents in all respects.

We claim:

1. A night vision device (NVD) comprising:

an image intensifier tube;

a source of electrical power for said image intensifier tube;

a switch circuit which in a first position of said NVD relative to the earth allows electrical power supply to said image intensifier tube, in a second position of said NVD relative to the earth said switch circuit causing electrical power supply to said image intensifier tube to be discontinued;

whereby in said second position of the night vision device, said image intensifier tube is turned off;

wherein said switch circuit includes an acceleration-responsive switch sensing movement of said NVD between the first and second positions; in which said acceleration-responsive switch senses accelerations applied to the night vision device;

wherein said switch circuit further includes a time delay circuit portion delaying the turning off of said image intensifier tube for a certain interval after each of: the sensing by said acceleration-responsive switch of movement of the NVD to said second position, and after the application of a sufficient acceleration to the NVD affecting said acceleration-responsive switch.

2. The NVD of claim 1 wherein said switch circuit further includes a re-set function preventing shutting off of said image intensifier tube after the application of a sufficient acceleration to the NVD affecting said acceleration-responsive switch, but which acceleration is not sustained long enough to exceed said certain interval.

3. The NVD of claim 1 wherein said NVD also includes a supplemental source of infrared illumination operable when said image intensifier tube is operated, said switch circuit also including means for turning off said supplemental source of illumination simultaneously with turning off of said image intensifier tube.

4. A night vision device (NVD) comprising:
an image intensifier tube, said image intensifier tube being capable of providing a visible image in response to receipt of light;
a single battery cell providing battery voltage for providing the sole source of electrical power to the image intensifier tube;
a low-voltage voltage step-up circuit receiving battery power at battery voltage and responsively providing as an output an intermediate voltage which is above battery voltage, said low-voltage voltage step-up circuit further having a shutdown terminal to which supply of a signal causes said circuit to discontinue supply of said intermediate voltage as an output and to provide substantially zero voltage as an output;
a high-voltage voltage step-up circuit receiving said intermediate voltage and responsively providing high voltage levels to the image intensifier tube to provide said visible image; and
a switch circuit in response to a pre-determined criteria connecting a signal to said shutdown terminal;
whereby, occurrence of said pre-determined criteria causes said low-voltage voltage step-up circuit to shut down, causing said high-voltage voltage step-up circuit to cease providing said high voltage levels to said image intensifier tube, and causing said image intensifier tube to cease providing said image.

5. The NVD of claim 4 wherein said switch circuit includes an acceleration-responsive switch sensing acceleration applied to said night vision device, and said pre-determined criteria includes the application of acceleration to said NVD which exceeds a certain vector.

6. The NVD of claim 4 wherein said switch circuit further includes a time delay circuit portion delaying the turning off of said image intensifier tube for a certain interval after said acceleration-responsive switch senses acceleration of said NVD which exceeds said certain vector.

7. A method of operating a NVD having an image intensifier tube, said method comprising steps of:
providing a source of electrical power for said image intensifier tube; and
providing a switch circuit within said NVD which in a first position of said NVD relative to the earth allows electrical power supply to said image intensifier tube, and which in a second position of said NVD relative to the earth causes electrical power supply to said image intensifier tube to be discontinued;
wherein said step of providing said switch circuit includes the step of using an acceleration-responsive switch to sense movement of said NVD between the first and second positions;
further including the step of using said acceleration-responsive switch to also sense accelerations applied to the night vision device;
further including the steps of including a time delay circuit in association with said switch circuit, and utilizing said time delay circuit to delay the turning off of said image intensifier tube for a certain interval after movement of the NVD from said first to said second position.

8. The method of claim 7 further including the step of utilizing the time delay circuit to also delay for said certain interval the turning off of the NVD after application of a sufficient acceleration to the NVD affecting said acceleration-responsive switch.

9. The method of claim 8 further including the step of including a re-set function in said time delay circuit which re-set function prevents shutting off of said image intensifier tube after the application of a sufficient acceleration to the NVD affecting said acceleration-responsive switch, but which acceleration is not sustained long enough to exceed said certain interval.

10. A method of providing night vision, said method comprising steps of:
providing an image intensifier tube;
using a single battery cell to provide battery voltage as the sole source of electrical power to the image intensifier tube, and utilizing the image intensifier tube to provide a visible image in response to receipt of light when battery voltage is connected to provide said sole source of electrical power to the image intensifier tube;
providing a low-voltage voltage step-up circuit receiving battery power at battery voltage and responsively providing an intermediate voltage which is above battery voltage;
providing a high-voltage voltage step-up circuit receiving said intermediate voltage and responsively providing high voltage levels to the image intensifier tube for operation of the image intensifier tube;
providing said low-voltage voltage step-up circuit with a shutdown terminal causing said low-voltage voltage step-up circuit to reduce its output from said intermediate voltage to substantially less than battery voltage when a certain signal is provided at said shutdown terminal, so that said battery voltage is not connected to provide said sole source of electrical power to the image intensifier tube upon said certain signal being provided to said shutdown terminal; and
utilizing a switch circuit responsive to a pre-determined criteria to provide said certain signal to said shutdown terminal.

11. The method of claim 10 further including the steps of including in said pre-determined criteria the application to a night vision device (NVD) practicing this method of an acceleration which exceeds a certain value, and utilizing an acceleration-responsive switch sensing the acceleration applied to said NVD.

12. The method of claim 11 further including the step of including in association with said switch circuit a time delay circuit delaying the turning off of said image intensifier tube for a certain interval after said acceleration-responsive switch senses acceleration of said NVD which exceeds said certain value.

13. A night vision device (NVD) comprising:
an image intensifier tube;
a source of electrical power for said image intensifier tube; and a tilt switch in a first position of said NVD allowing electrical power supply to said image intensifier tube, and in a second position of said NVD said tilt switch causing electrical power supply to said image intensifier tube to be discontinued so that said image intensifier tube is turned off; further including a time delay circuit in association with said tilt switch and delaying the turning off of said image intensifier tube for a certain interval after movement of the NVD from said first to said second position.

14. A night vision device (NVD) comprising:

an image intensifier tube providing a visible image in response to a supply of electrical power and the receipt of light;

a source of electrical power for the image intensifier tube;

an optical system admitting light to the image intensifier tube;

a switch circuit supplying electrical power from said source to said image intensifier tube, and being responsive to an output response to effect a shut down of said image intensifier tube;

an acceleration-responsive element responding to acceleration applied to said NVD to provide said output response; and a time delay element which for a certain time interval after said output response delays the shutting down of said image intensifier tube.

\* \* \* \* \*